United States Patent
Fujii

(10) Patent No.: US 7,107,164 B2
(45) Date of Patent: Sep. 12, 2006

(54) LEADING WAVE POSITION DETECTING UNIT, RECEIVER, LEADING POSITION DETECTING UNIT, LEADING WAVE POSITION DETECTING METHOD AND LEADING POSITION DETECTING METHOD

(75) Inventor: Teruya Fujii, Saitama (JP)

(73) Assignee: NTT DoCoMo, Inc., Tokyo (JP)

(*) Notice: Subject to any disclaimer, the term of this patent is extended or adjusted under 35 U.S.C. 154(b) by 1400 days.

(21) Appl. No.: 09/784,472

(22) Filed: Feb. 15, 2001

(65) Prior Publication Data

US 2001/0014132 A1 Aug. 16, 2001

(30) Foreign Application Priority Data

Feb. 15, 2000 (JP) .............................. 2000-037092

(51) Int. Cl.
*G06F 19/00* (2006.01)
(52) U.S. Cl. .............................. 702/66; 375/225
(58) Field of Classification Search ................. 702/66, 702/176; 375/200, 225; 455/561
See application file for complete search history.

(56) References Cited

U.S. PATENT DOCUMENTS

| | | | |
|---|---|---|---|
| 5,423,067 A | 6/1995 | Manabe | 455/56.1 |
| 5,614,914 A * | 3/1997 | Bolgiano et al. | 342/364 |
| 5,621,752 A * | 4/1997 | Antonio et al. | 375/144 |
| 6,025,944 A * | 2/2000 | Mendez et al. | 398/78 |
| 6,745,050 B1 * | 6/2004 | Forsythe et al. | 455/561 |

FOREIGN PATENT DOCUMENTS

| | | |
|---|---|---|
| EP | 0814573 A2 | 12/1997 |
| EP | 1096711 A1 | 5/2001 |
| JP | 09008767 A | 1/1997 |
| JP | 11261499 A | 9/1999 |
| JP | 2000-284040 | 10/2000 |
| JP | 2001-053730 | 2/2001 |
| JP | 2003-218848 | 7/2003 |
| WO | WO 99/63677 | 12/1999 |

OTHER PUBLICATIONS

Wideband Radio Propagation Modeling for Indoor Geolocation Applications Kaveh Pahlavan, Prashant Krisnamurthy and Jacques Beneat Worcester Polytechnic Institute XP-000752571 Apr. 1998.

* cited by examiner

Primary Examiner—Edward Raymond
(74) Attorney, Agent, or Firm—Workman Nydegger

(57) ABSTRACT

A leading wave position detecting unit and method etc. is provided for detecting the position of the leading wave in a delay profile. Time spaces between sampled values ($\tau_1$–$\tau_{13}$) in the delay profile are measured. Among the measured time spaces, a maximum time space ($\tau_8$) is determined, and the position of its immediately following sampled value (sampled value (h)) is detected as a leading position. The initial peak of the sampled values after the leading position detected (position of sampled value (j)) is determined as a leading wave position.

9 Claims, 11 Drawing Sheets

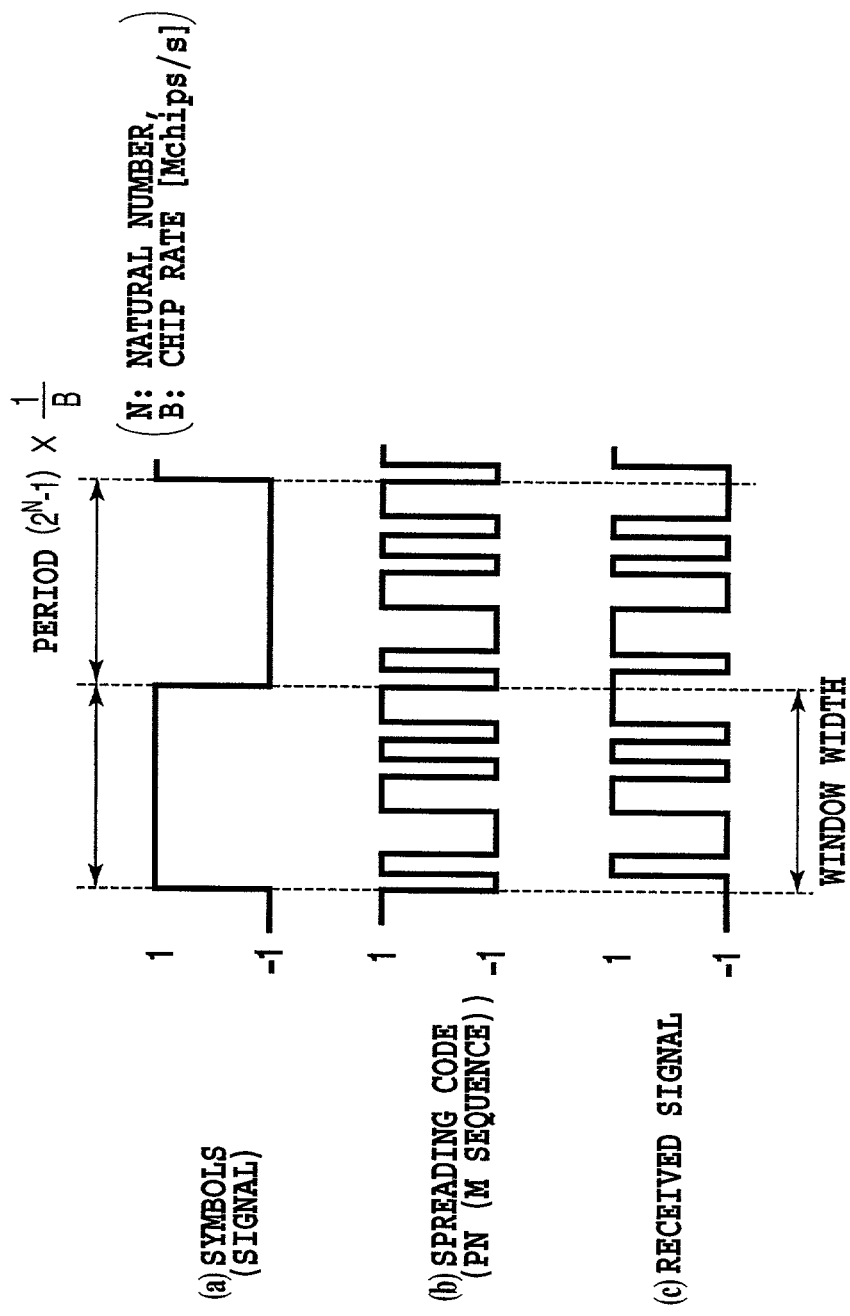

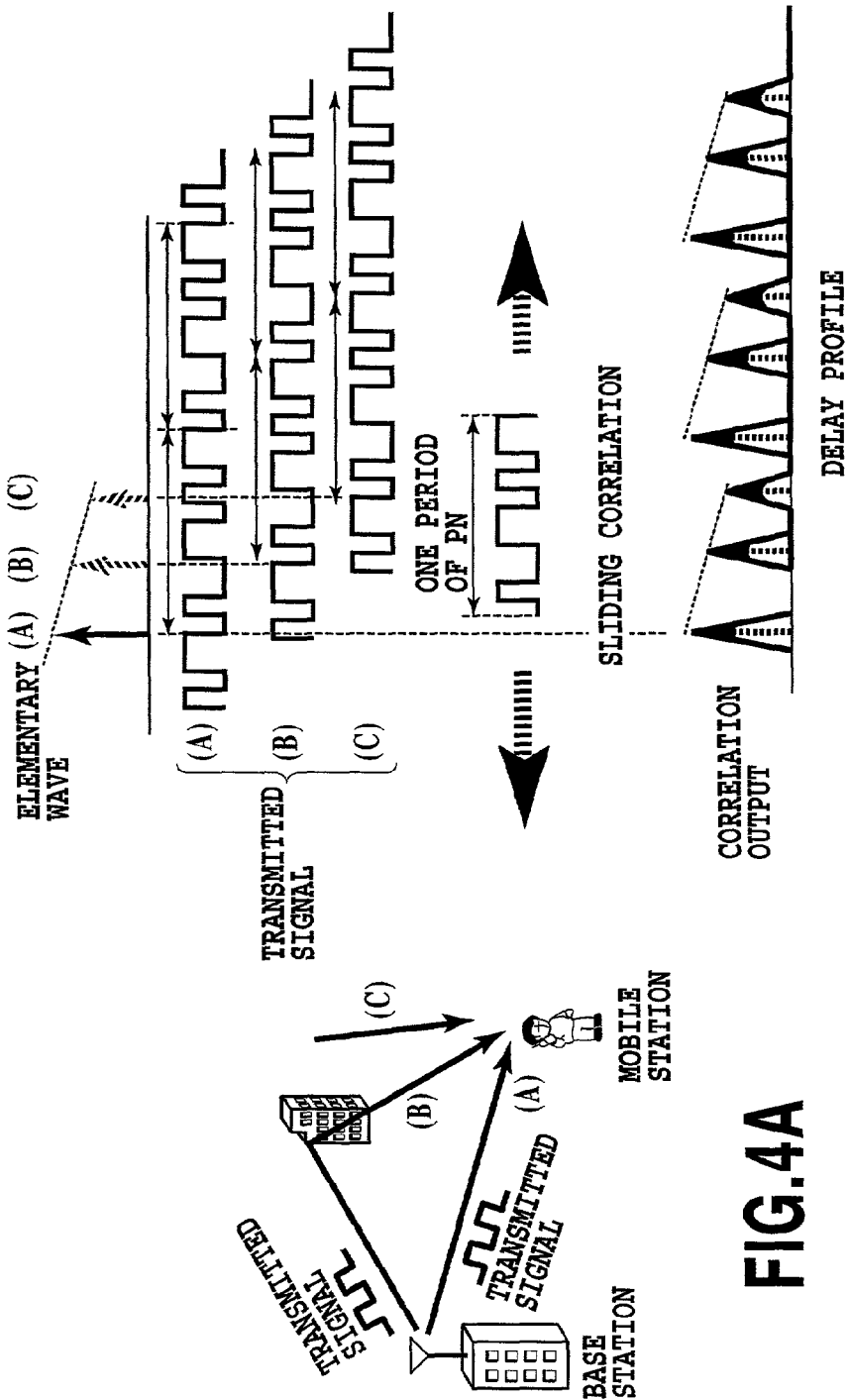

LEADING WAVE POSITION DETECTING UNIT, RECEIVER, LEADING POSITION DETECTING UNIT, LEADING WAVE POSITION DETECTING METHOD AND LEADING POSITION DETECTING METHOD

This application claims the priority of Patent Application NO. 2000-37092 filed Feb. 15, 2000 in Japan, the content of which is incorporated hereinto by reference.

BACKGROUND OF THE INVENTION

1. Field of the Invention

The present invention relates to a leading wave position detecting unit, method and the like for detecting the position of the leading wave in a delay profile.

2. Description of Related Art

FIG. 1A is a diagram illustrating a case where a mobile station receives a radio wave from a base station antenna along with radio waves that are reflected or diffracted from buildings and the like and arrive at the mobile station, and FIG. 1B is a diagram illustrating an example of a (propagation) delay profile. The radio waves (1), (2) and (3) in the delay profile are called an elementary wave (path).

In the delay profile as illustrated in FIG. 1B, the axis of abscissas represents the propagation delay time (called "delay time" from now on) of incoming radio waves to the mobile station, and the axis of ordinates represents the received power. The axis of ordinates can represent a propagation loss. The received power or the propagation loss can be represented in terms of an absolute value or a relative value.

FIG. 2 is a block diagram showing a configuration of a conventional receiver. The receiver as shown in FIG. 2 comprises an antenna 120, despreading code generators 122 and 136, multipliers 124 and 138, a delay profile measuring section 126, an averaging section 127, a noise level detector 128, an eliminator 130, a path selector 132, a detection timing setting section 134, and a RAKE combiner 140.

Receiving a signal via an antenna 120, the multiplier 124 multiplies it by a despreading code generated by the despreading code generator 122 so that the received signal is despread and the paths are divided. The delay profile measuring section 126 measures the received powers of the divided paths, thereby measuring (producing) the delay profile.

Since the measured delay profile includes noise, it is suppressed by the averaging section 127, noise level detector 128, and eliminator 130.

The path selector 132 selects the paths (paths with large received power, for example) appropriate for the RAKE combining from the noise-suppressed delay profile. The detection timing setting section 134 sets detection timing in consideration of the paths selected by the path selector 132. The despreading code generator 136 generates a despreading code in response to the detection timing determined by the detection timing setting section 134. The multiplier 138 despreads the signal received via the antenna 120, and the path selector 132 selects the paths to be supplied to the RAKE combiner 140 from the received signal. The RAKE combiner 140 carries out the RAKE combining of the input paths. The RAKE combined signal undergoes deinterleaving and the like thereafter. Thus, the finally demodulated data is obtained.

Assume that a communication unit A transmits a signal to a communication unit B, and the communication unit B measures the delay profile of the received signal. If the position of the leading wave can be detected in the measured delay profile, the distance between the communication unit A (transmitting site) and the communication unit B (receiving site) can be obtained.

In the example of FIGS. 1A and 1B, the leading wave is 20 the path (1).

The delay profile as illustrated in FIG. 1B, however, is an ideal delay profile, and when an actual delay profile is measured, the path position remains undeterminable because of reception (detection) timing.

This will be described taking an example of CDMA. The received signal is received in the form of a signal (c) of FIG. 3 consisting of a superposition of a signal (a) of FIG. 3 and a spreading code (b) of FIG. 3. The spreading code (short code) remains invariant for each symbol so that the delay profile is observed for each symbol. The observational length for each symbol is commonly called window width.

To obtain the delay profile by despreading the received signal (transmitted signal), waveforms (correlation outputs) as shown in FIGS. 4A and 4B are lo obtained in which the paths (A), (B) and (C) are repeated.

Thus, the path position remains undeterminable because of the reception (detection) timing.

For example, actual measurement of the delay profile as illustrated in FIG. 1B can provide path position relationships as shown in FIG. 5A, FIG. 5B or FIG. 1B, which means that the path alignment is uncertain. Therefore, it is desired to establish a method of detecting the path associated with the leading wave. Here, the order of path (1)→path (2)→path (3)→path (1) is fixed.

Although one symbol length is commonly much longer than a maximum delay time, if it is not much longer than the maximum delay time, the window width can be equivalently widened by combining the short code with a long code.

In addition, in the actual measurement of the delay profile, the waveforms blunt because of a frequency bandwidth limit. The delay profiles as illustrated in FIGS. 1B, 5A and 5B are an ideal delay profile when the frequency bandwidth is infinite.

FIG. 6 is a diagram illustrating an example where the delay profile as illustrated in FIG. 1B is actually measured. The delay profile as illustrated in FIG. 6 (on which a frequency bandwidth limit is imposed) corresponds to the delay profile as illustrated in FIG. 5A (on which no frequency bandwidth limit is imposed). As illustrated in FIG. 6, the waveforms of the delay profile blunt. Accordingly, even if it is found that the mountain-like portion including the path (1) is the region (1') that includes the leading wave, the position of the leading wave (1) cannot be identified.

Incidentally, the delay profile is commonly measured by sampling, and the delay profile as illustrated in FIG. 6 is a delay profile measured by sampling.

As a conventional leading wave position detecting method, there is a method of detecting the position of the leading wave in terms of the position at which the sampled value (received power or the like) is maximum. The method, however, causes many erroneous detection. For example, applying the method to the case of FIG. 6, it detects the position of the path (2) as the position of the leading wave.

SUMMARY OF THE INVENTION

It is therefore an object of the present invention to detect the position of the leading wave correctly in the delay profile.

To accomplish the object of the present invention, according to the first aspect of the present invention, there is provided a leading wave position detecting unit for detecting a leading wave position in a delay profile, the leading wave position detecting unit comprising: time space measuring means for measuring time spaces between sampled values of a delay profile sampled along a delay time axis; leading position detecting means for detecting a position of a sampled value immediately after a maximum time space from among time spaces measured by the time space measuring means as a leading position; and leading wave position detecting means for detecting an initial peak position of the sampled values after the leading position detected by the leading position detecting means as a leading wave position.

Here, the leading wave position detecting unit may further comprise noise suppressing means for suppressing noise of the delay profile, and the time space measuring means may measure the time spaces between the sampled values of the delay profile with its noise suppressed by the noise suppressing means.

Here, the sampled values may be received power values.

According to the second aspect of the present invention, there is provided a receiver comprising: time space measuring means for measuring time spaces between sampled values of a delay profile sampled along a delay time axis; leading position detecting means for detecting a position of a sampled value immediately after a maximum time space from among time spaces measured by the time space measuring means as a leading position; and leading wave position detecting means for detecting an initial peak position of the sampled values after the leading position detected by the leading position detecting means as a leading wave position, wherein the delay profile is a delay profile in terms of paths generated by despreading and dividing, at a receiving side, a transmitted signal spread using a spreading code.

According to the third aspect of the present invention, there is provided a leading position detecting unit for detecting a leading position in a delay profile, the leading position detecting unit comprising: time space measuring means for measuring time spaces between sampled values of a delay profile sampled along a delay time axis; and leading position detecting means for detecting a position of a sampled value immediately after a maximum time space from among time spaces measured by the time space measuring means as a leading position.

According to the fourth aspect of the present invention, there is provided a leading wave position detecting method for detecting a leading wave position in a delay profile, the leading wave position detecting method comprising: a time space measuring step of measuring time spaces between sampled values of a delay profile sampled along a delay time axis; a leading position detecting step of detecting a position of a sampled value immediately after a maximum time space from among time spaces measured in the time space measuring step as a leading position; and a leading wave position detecting step of detecting an initial peak position of the sampled values after the leading position detected in the leading position detecting step as a leading wave position.

Here, the leading wave position detecting method may further comprise a noise suppressing step of suppressing noise of the delay profile, and the time space measuring step may measure the time spaces between the sampled values of the delay profile with its noise suppressed by the noise suppressing step.

Here, the sampled values may be received power values.

According to the fifth aspect of the present invention, there is provided a leading position detecting method for detecting a leading position in a delay profile, the leading position detecting method comprising: a time space measuring step of measuring time spaces between sampled values of a delay profile sampled along a delay time axis; and a leading position detecting step of detecting a position of a sampled value immediately after a maximum time space from among time spaces measured by the time space measuring step as a leading position.

According to the foregoing configurations, the position of the leading wave can be detected correctly in the delay profile.

The above and other objects, effects, features and advantages of the present invention will become more apparent from the following description of an embodiment thereof taken in conjunction with the accompanying drawings.

BRIEF DESCRIPTION OF THE DRAWINGS

FIG. 3 is a diagram illustrating a received signal;

FIGS. 4A and 4B are diagrams illustrating an outline of delay profile measurement;

DETAILED DESCRIPTION OF THE PREFERRED EMBODIMENTS

The invention will now be described with reference to the accompanying drawings.

Figure 1A:
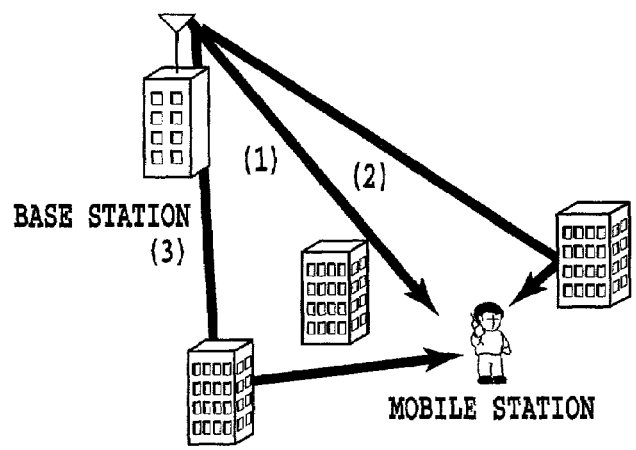
FIG. 1A is a diagram illustrating a case where a mobile station receives a radio wave from a base station antenna along with radio waves that are reflected or diffracted from buildings and the like and arrive at the mobile station.
Figure 1B:
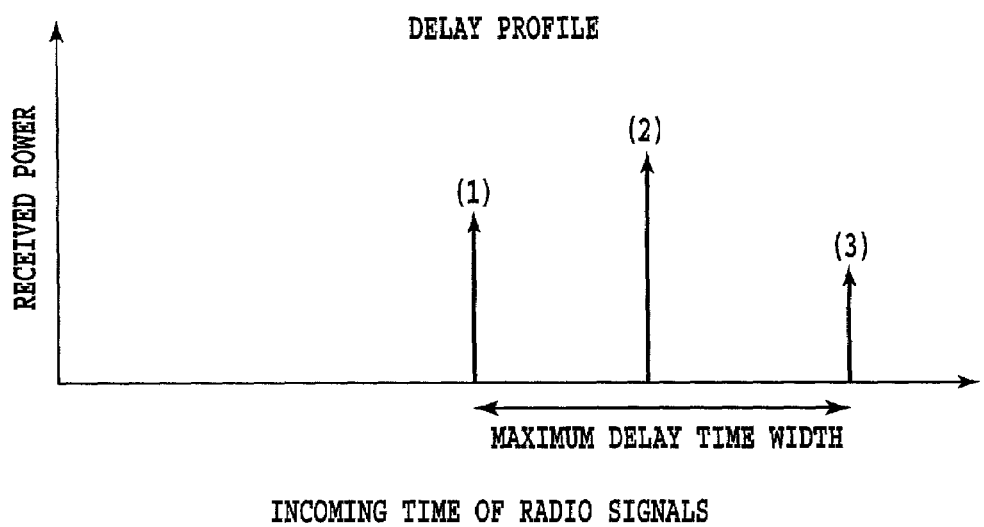
FIG. 1B is a diagram illustrating an example of a (propagation) delay profile.
Figure 2:
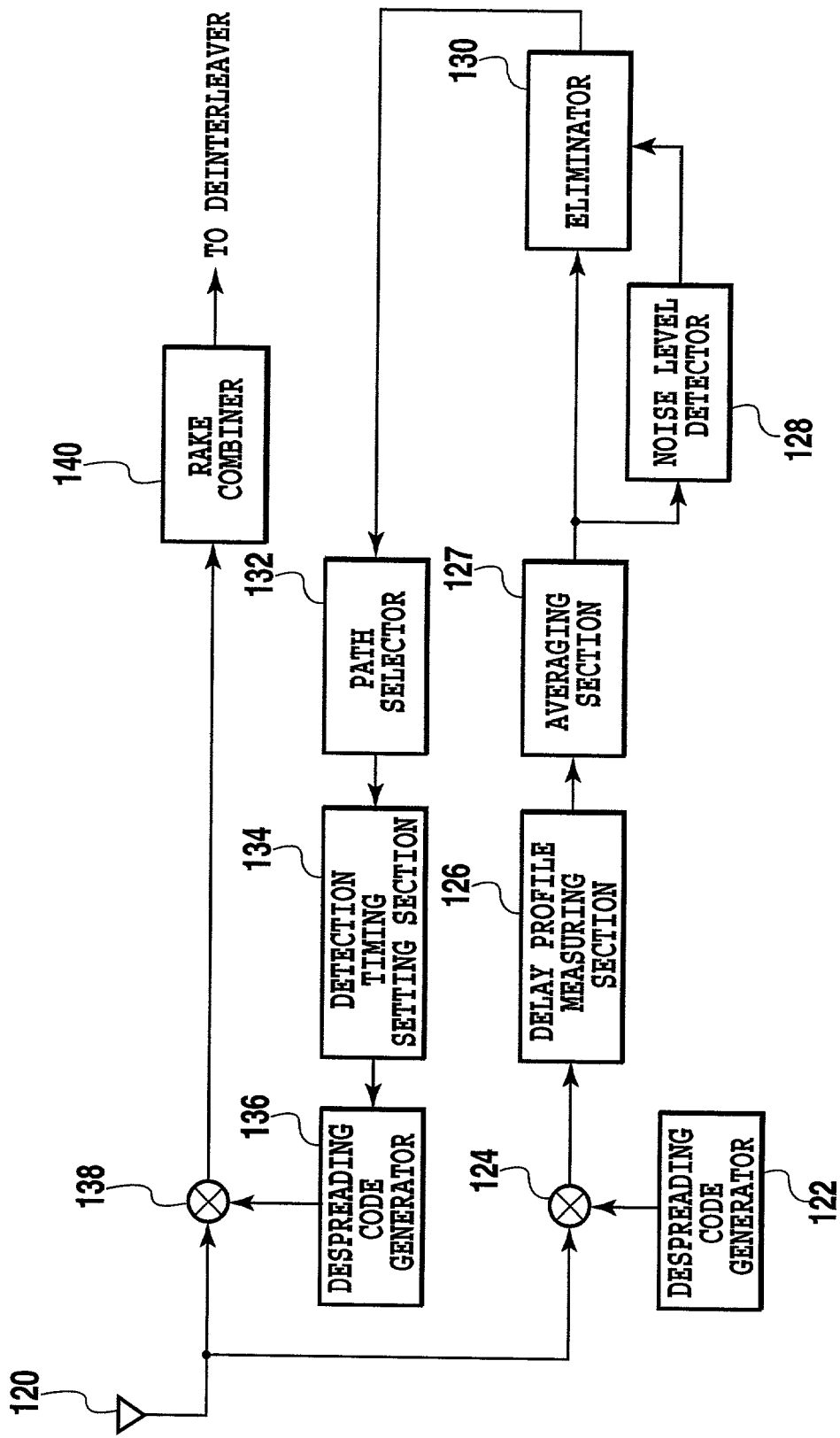
FIG. 2 is a block diagram showing a configuration of a conventional receiver.
Figure 5A:
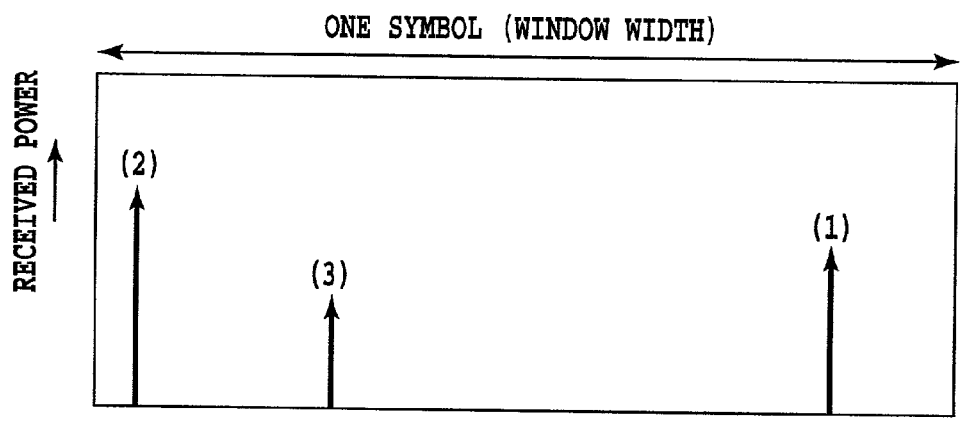
FIGS. 5A and 5B are diagrams illustrating relationships between path positions when actually measuring the delay profile as illustrated in FIG. 1B.
Figure 5B:
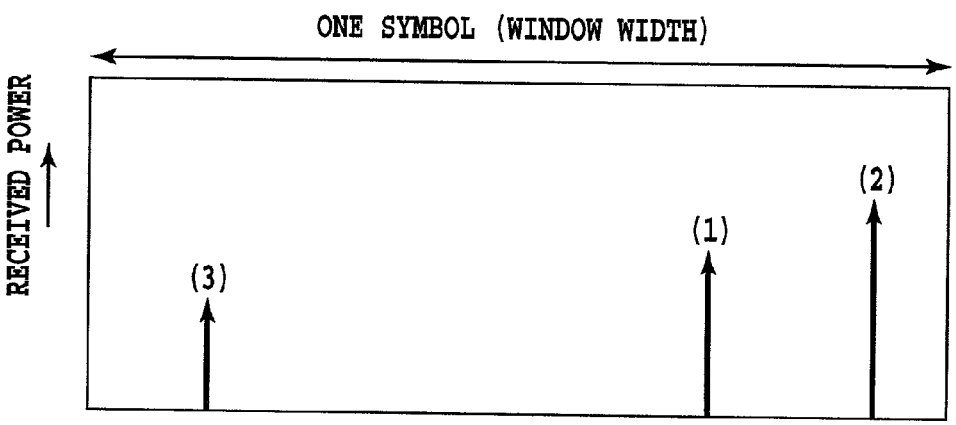
Figure 6:
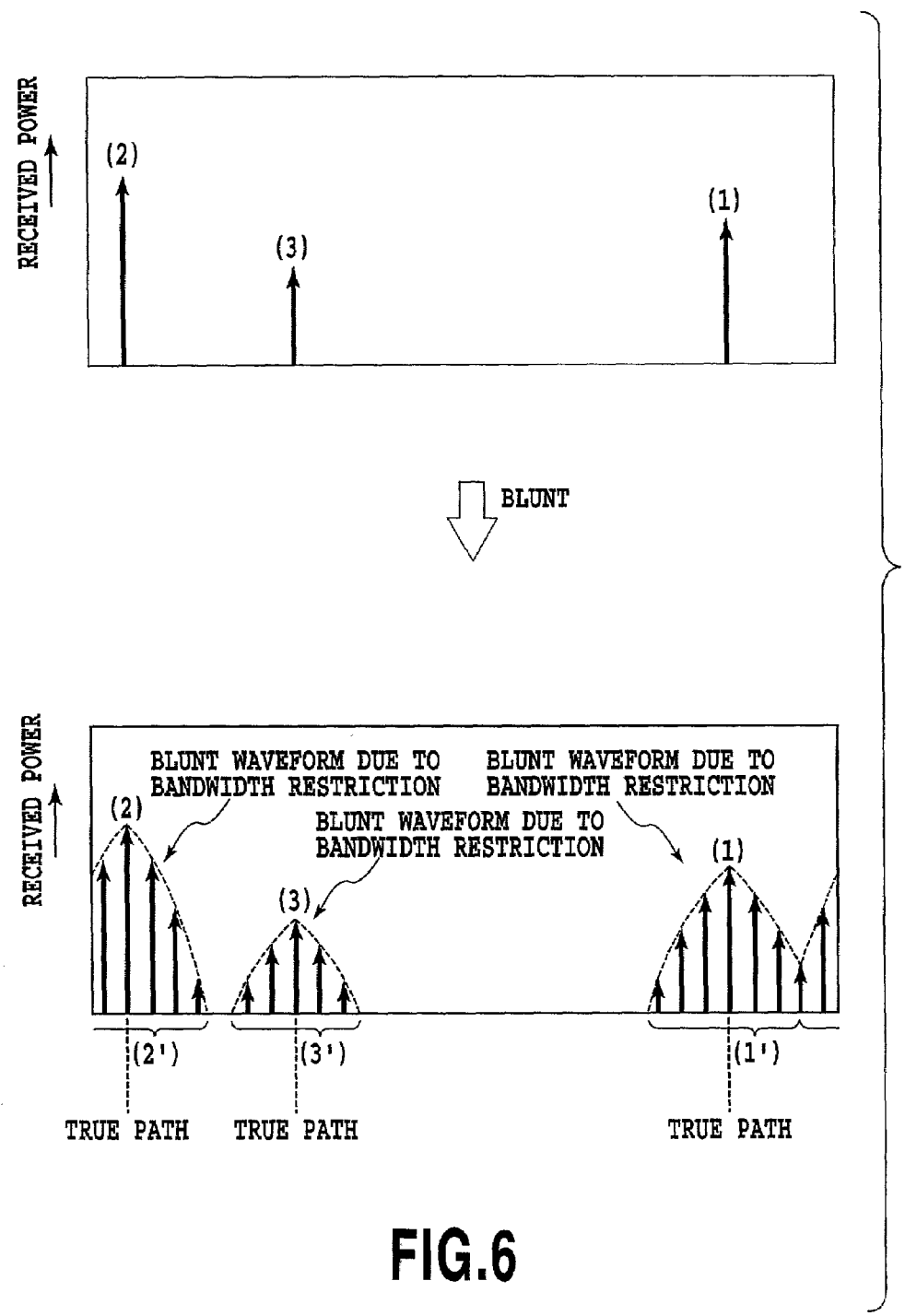
FIG. 6 is a diagram illustrating an example when actually measuring the delay profile as illustrated in FIG. 1B.
Figure 7:
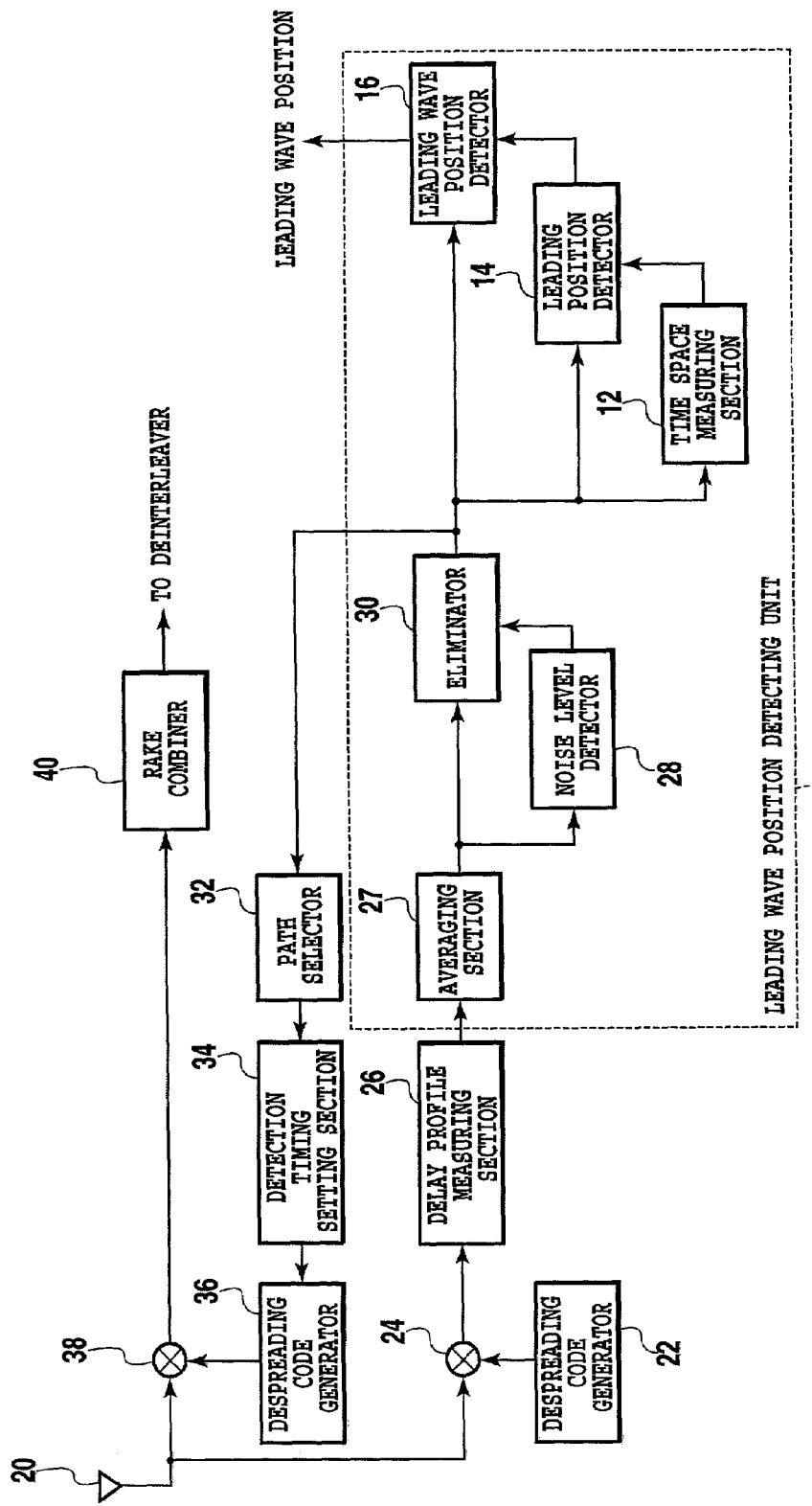
FIG. 7 is a block diagram showing a configuration of a receiver of an embodiment in accordance with the present invention.

FIG. 7 is a block diagram showing a configuration of a receiver of an embodiment in accordance with the present invention. The receiver of the present embodiment comprises a leading wave position detecting unit 10, an antenna 20, despreading code generators 22 and 36, multipliers 24 and 38, a delay profile measuring section 26, a path selector 32, a detection timing setting section 34, and a RAKE combiner 40.

The leading wave position detecting unit 10 comprises an averaging section 27, a noise level detector 28, an eliminator 30, a time space measuring section 12, a leading position detector 14 and a leading wave position detector 16. The leading wave position detecting unit 10 can be implemented either in the form of hardware, or software using a DSP (Digital Signal Processor) etc.

Receiving a signal via the antenna 20, the multiplier 24 multiplies it by a despreading code generated by the despreading code generator 22 so that the received signal is despread and the paths are divided. The delay profile measuring section 26 measures the received powers of the divided paths, thereby measuring (producing) the delay profile. The measurement is carried out by sampling.

Since the measured delay profile includes noise, it is suppressed through the averaging section 27, noise level detector 28, and eliminator 30 as follows.

The averaging section 27 carries out (time) averaging of the sampled values (received powers in the present embodiment) of the delay profile (or the delay profile obtained by carrying out in-phase addition to further suppress the noise).

Figure 8:
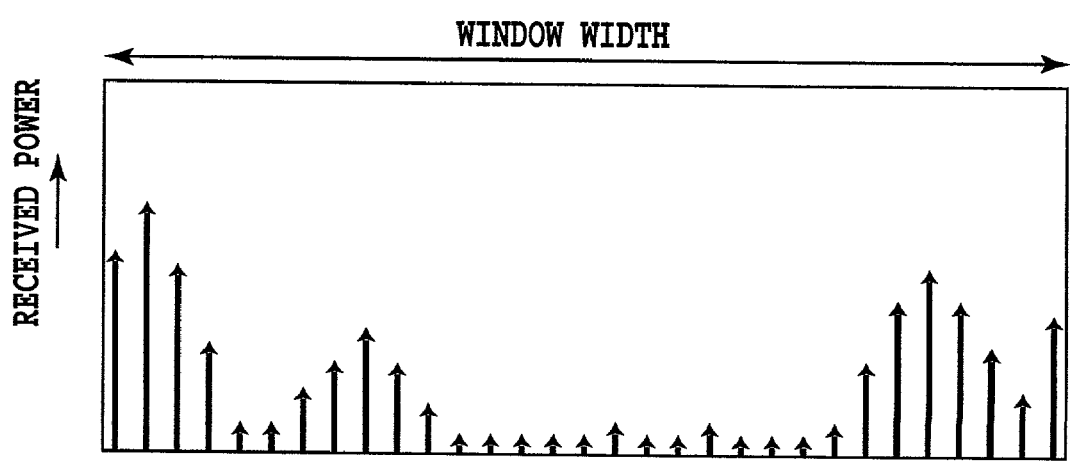
FIG. 8 is a diagram illustrating an example of a delay profile averaged by an averaging section.

FIG. 8 is a diagram illustrating an example of the delay profile averaged by the averaging section 27, in which 31 sampled values are shown.

The noise level detector 28 detects the noise level of the delay profile. Specifically, it obtains the cumulative probability of the sampled values, and makes the sampled value (received power) corresponding to a predetermined cumulative probability X [%] a noise level $N_0$. As a concrete value of X, 50[%] can be used, for example.

Figure 9:
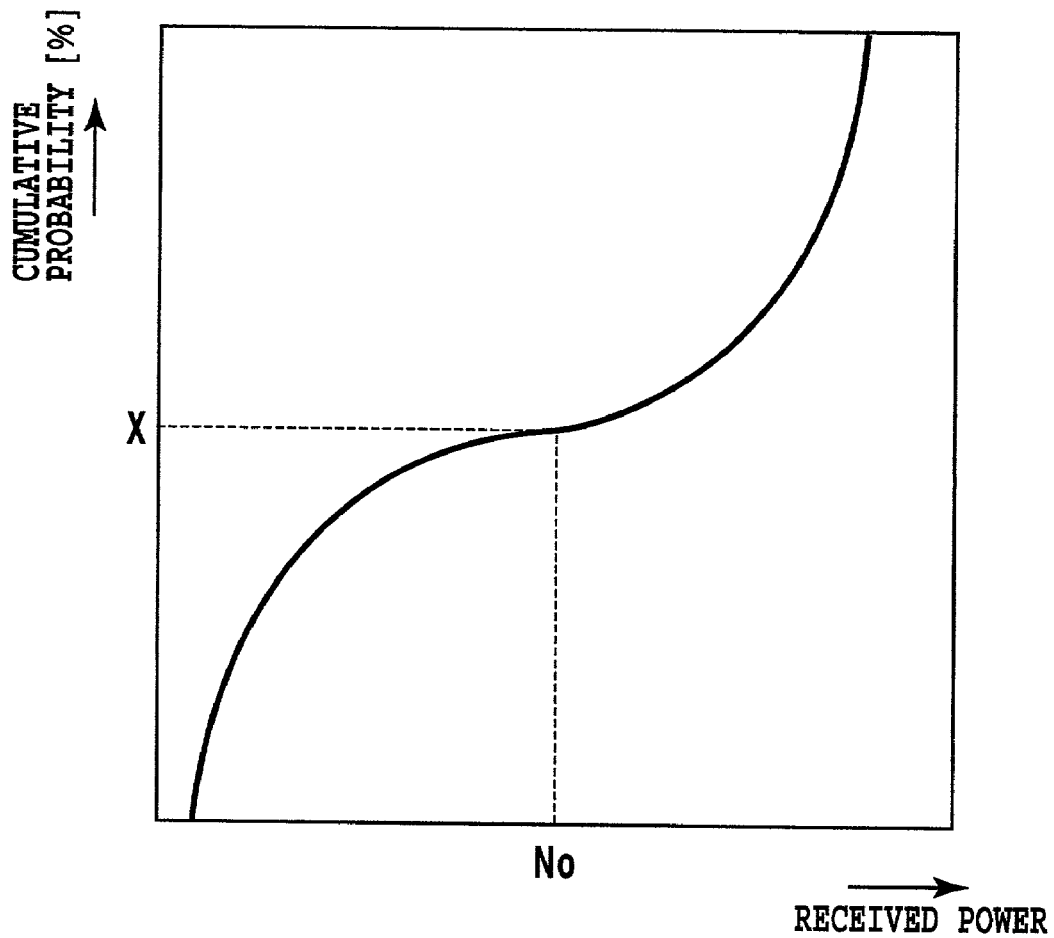
FIG. 9 is a diagram illustrating an example when obtaining a cumulative probability with sampled values.

FIG. 9 is a diagram illustrating an example when obtaining the cumulative probability of the sampled values.

The eliminator 30 considers sampled values less than a path level threshold value $L_{th}=N_0+\Delta L$ as noise, and removes these sampled values from the delay profile, where $N_0$ is a noise level detected by the noise level detector 28, and $\Delta L$ is a predetermined value that may be zero.

Figure 10:
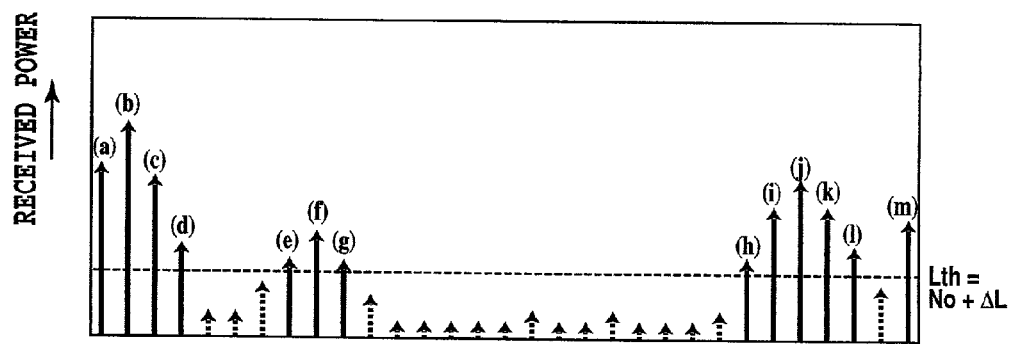
FIG. 10 is a diagram illustrating a delay profile in which sampled values considered as noise are removed from the delay profile as illustrated in FIG. 8.

FIG. 10 is a diagram illustrating a delay profile obtained by removing the sampled values considered as noise from the delay profile as illustrated in FIG. 8. In the example as illustrated in FIG. 10, 18 sampled values that are less than the path level threshold value $L_{th}$ are considered as noise, and are eliminated. On the other hand, 13 sampled values (a)–(m) remain because they are equal to or greater than the path level threshold value $L_{th}$.

To suppress noise, although it is preferable to carry out the averaging processing (by the averaging section 27) and the threshold value processing (by the noise level detector 28 and eliminator 30), the averaging processing and/or threshold value processing can be obviated.

The delay profile undergone the noise elimination by the eliminator 30 is supplied to the time space measuring section 12 etc. The time space measuring section 12 measures the time spaces (widths) between the sampled values of the input delay profile.

Figure 11:
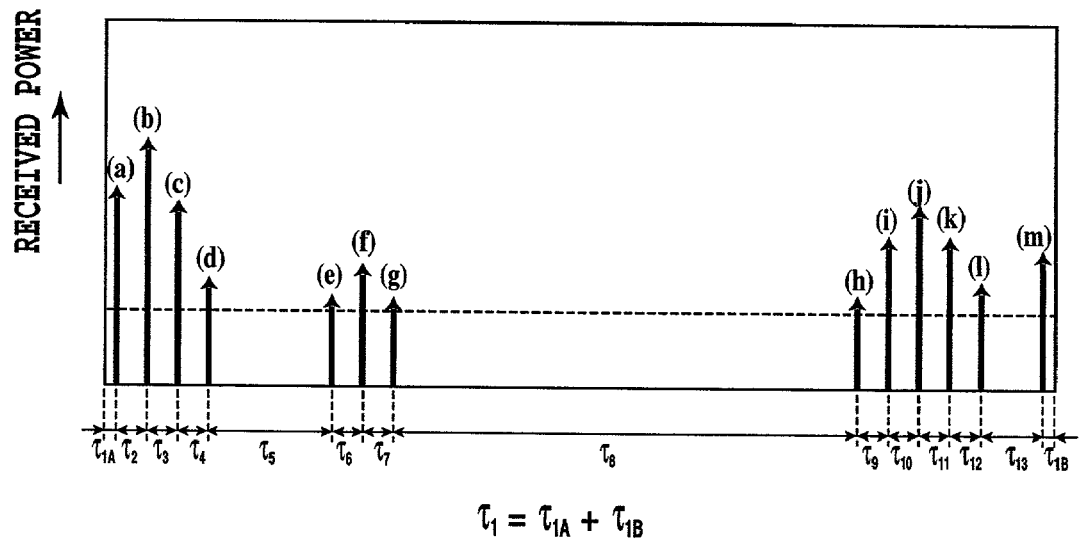
FIG. 11 is a diagram illustrating time spaces between sampled values of the delay profile as illustrated in FIG. 10.

FIG. 11 is a diagram illustrating the time spaces between sampled values of the delay profile as illustrated in FIG. 10. In FIG. 11, time spaces $\tau_1$–$\tau_{13}$ are illustrated, in which the space $\tau_1$ between the sampled values (m) and (a) is represented as the sum of $\tau_{1A}$ and $\tau_{1B}$.

The leading position detector 14 obtains a maximum value of the time spaces measured by the time space measuring section 12, and detects the position of the sampled value immediately after the maximum time space in the delay profile as the leading position. In the example of FIG. 11, the time space $\tau_8$ is the maximum value so that the position of the sampled value immediately after it, that is, the position of the sampled value (h) is detected as the leading position.

The leading wave position detector 16 detects the initial peak position of the sample values after the leading position detected by the leading position detector 14 as the leading wave position.

A detecting method of the leading wave position by the leading wave position detector 16 will be described in more detail. It assigns the sampling numbers 1, 2, . . . to the sampled values beginning from the leading position. In the example as illustrated in FIG. 11, the sampled value (h) is assigned a sampling number 1, the sampled value (i) is assigned a sampling number 2, followed by assigning the sampling numbers in a similar way until the sampled value (g) is assigned a sampling number 13. After assigning the sampling numbers, peak detection is carried out beginning from the sampled value with the sampling number 1. Then, the (position) of the sampled value with the minimum sampling number k+1(k=1, 2, . . . ) that satisfies the following condition is detected as the (position) of the leading wave.

$$E(k) \leq E(k+1) \geq E(k+2)$$

where E(k) is the sampled value of the sampling number k. In the example of FIG. 11, the sampled value (j) (sampling number 3) is detected as the leading wave.

Although the present embodiment utilizes the received power values as the sampled values, this is not essential. For example, other values such as propagation losses can be used.

In addition, although it is preferable to employ the leading wave position detected by the leading wave position detector 16 as the leading wave position, the leading position detected by the leading position detector 14 can be used as the leading wave position to simplify the system, in which case, the leading wave position detector 16 can be removed.

As described above, according to the present invention, the position of the leading wave can be detected correctly in the delay profile. Once the position of the leading wave has been detected correctly, the distance between the transmitting site and the receiving site of the signal can be obtained.

The present invention has been described in detail with respect to a preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A leading wave position detecting unit for detecting a leading wave position in a delay profile, said leading wave position detecting unit comprising:

time space measuring means for measuring time spaces between sampled values of a delay profile sampled along a delay time axis;

leading position detecting means for detecting a position of a sampled value immediately after a maximum time space from among time spaces measured by said time space measuring means as a leading position; and leading wave position detecting means for detecting an initial peak position of the sampled values after the leading position detected by said leading position detecting means as a leading wave position.

2. The leading wave position detecting unit as claimed in claim 1, further comprising:

noise suppressing means for suppressing noise of the delay profile, wherein said time space measuring means measures the time spaces between the sampled values of the delay profile with its noise suppressed by said noise suppressing means.

3. The leading wave position detecting unit as claimed in claim 1, wherein the sampled values are received power values.

4. A receiver comprising:
   time space measuring means for measuring time spaces between sampled values of a delay profile sampled along a delay time axis;
   leading position detecting means for detecting a position of a sampled value immediately after a maximum time space from among time spaces measured by said time space measuring means as a leading position; and
   leading wave position detecting means for detecting an initial peak position of the sampled values after the leading position detected by said leading position detecting means as a leading wave position, wherein
   the delay profile is a delay profile in terms of paths generated by despreading and dividing, at a receiving side, a transmitted signal spread using a spreading code.

5. A leading position detecting unit for detecting a leading position in a delay profile, said leading position detecting unit comprising:
   time space measuring means for measuring time spaces between sampled values of a delay profile sampled along a delay time axis; and
   leading position detecting means for detecting a position of a sampled value immediately after a maximum time space from among time spaces measured by said time space measuring means as a leading position.

6. A leading wave position detecting method for detecting a leading wave position in a delay profile, said leading wave position detecting method comprising:
   a time space measuring step of measuring time spaces between sampled values of a delay profile sampled along a delay time axis;
   a leading position detecting step of detecting a position of a sampled value immediately after a maximum time space from among time spaces measured in said time space measuring step as a leading position; and
   a leading wave position detecting step of detecting an initial peak position of the sampled values after the leading position detected in said leading position detecting step as a leading wave position.

7. The leading wave position detecting method as claimed in claim 6, further comprising:
   a noise suppressing step of suppressing noise of the delay profile, wherein
   said time space measuring step measures the time spaces between the sampled values of the delay profile with its noise suppressed by said noise suppressing step.

8. The leading wave position detecting method as claimed in claim 6, wherein the sampled values are received power values.

9. A leading position detecting method for detecting a leading position in a delay profile, said leading position detecting method comprising:
   a time space measuring step of measuring time spaces between sampled values of a delay profile sampled along a delay time axis; and
   a leading position detecting step of detecting a position of a sampled value immediately after a maximum time space from among time spaces measured by said time space measuring step as a leading position.

* * * * *

UNITED STATES PATENT AND TRADEMARK OFFICE
CERTIFICATE OF CORRECTION

PATENT NO. : 7,107,164 B2
APPLICATION NO. : 09/784472
DATED : September 12, 2006
INVENTOR(S) : Fujii It is certified that error appears in the above-identified patent and that said Letters Patent is hereby corrected as shown below:

Column 2
Line 6, before "the path", remove "20"
Line 20, before "obtained", remove "lo"
Line 57, change "detection" to --detections--

Signed and Sealed this

Twenty-sixth Day of June, 2007

JON W. DUDAS
*Director of the United States Patent and Trademark Office*